Nov. 14, 1944.   C. N. HICKMAN   2,362,484
PRESSURE GAUGE
Filed May 10, 1943

Inventor
Clarence N. Hickman
By C. E. Herrstrom & H. E. Thibodeau
Attorneys

Patented Nov. 14, 1944

2,362,484

UNITED STATES PATENT OFFICE 2,362,484

PRESSURE GAUGE

Clarence N. Hickman, Jackson Heights, N. Y., assignor to the Government of the United States of America, as represented by the Secretary of War Application May 10, 1943, Serial No. 486,401

14 Claims. (Cl. 73—167)

(Granted under the act of March 3, 1883, as amended April 30, 1928; 370 O. G. 757)

The invention described herein may be manufactured and used by or for the Government for governmental purposes without the payment to me of any royalty thereon.

This invention relates to devices for measuring pressures, forces and other physical actions and is described, for ease in exposition in connection with gauges for measuring high pressures, such as are encountered in gun barrels, either of the type employing a metal container housing a deformable metal element which is placed within the gun barrel (usually close to the breech) or other chamber the pressure of which is to be measured; the invention may equally well be used in connection with gauges whose component parts are located outside the gun barrel (for example) and operatively connected to the pressure chamber thereof to permit pressures developed therein to actuate the gauge, which operative connection may be pneumatic or mechanical. Heretofore the deformable metal—usually copper—element employed has been in the shape of a cylinder placed lengthwise in the container between one end wall thereof and a piston slidably held in the container to transmit pressure to the copper cylinder (frequently referred to as "tarage cylinders").

The so-called "tarage cylinder" pressure gauge heretofore used is open to many objections and drawbacks, among which might be mentioned: Their useful range is small, principally due to the fact that the cylinders do not become permanently deformed until very considerable gas pressures have been reached; moreover, their Pressure-Deformation curves have steep slopes at low and high pressures, leaving a limited readable and useful curve at intermediate pressures. Lastly, the typical Pressure-Deformation curve of the tarage cylinder, either of copper (used for high gas pressures) or of lead (used for low gas pressures), is not linear for their lower pressure range.

It is the object of this invention to overcome the foregoing and other objections to the use of tarage cylinders. More particularly, one of the objects of this invention is to provide a gauge of the class described, which is equally well adapted for measuring relatively high pressures, and for measuring comparatively low gas pressures, considerably lower than those capable of being measured by the usual tarage cylinder. Another object of this invention is to provide a gauge the Pressure-Deformation curve of whose deformable element is linear over substantially its entire pressure range and hence readily and more accurately measurable. A further object is to provide an improved container or housing for the novel deformable element of this invention.

For the attainment of the foregoing and such other objects as may herein appear or be pointed out, I have shown one embodiment of my invention in the accompanying drawing, wherein.

Figure 2:
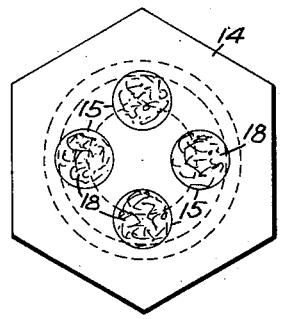
Fig. 2 is a top view thereof.

The improved container or housing comprises a short steel sleeve 10 of suitable thickness tapped at one end with inside threads in which is screwed a machine screw or plug 11, a copper washer 12 being interposed between the head of the screw and the end of sleeve or chamber 10. The other end of the sleeve is provided with outside threads by which the sleeve is screwed into a short closure member 13 which serves also as a cup for holding grease 18. Grease cup 13 is provided with a plurality, four as shown in Fig. 2, of port holes 15.

Figure 1:
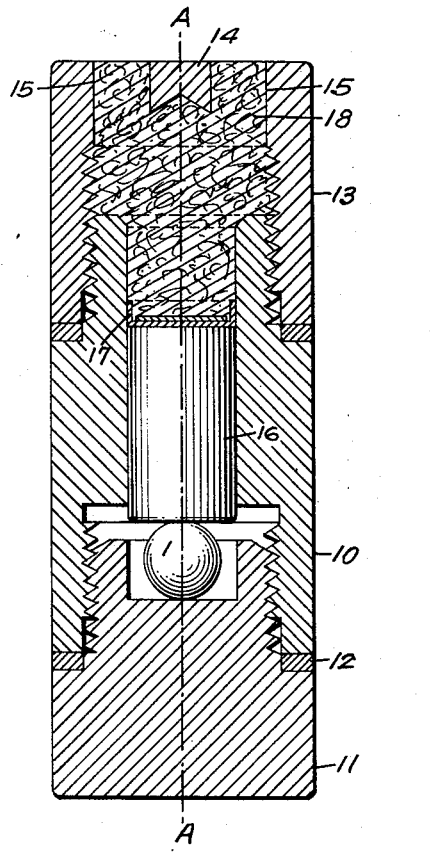
Fig. 1 is a sectional elevation of the improved gauge.

The deformable element, designated 1 in Fig. 1, is placed within the chamber 10 to rest on screw plug 11 and is interposed between the plug and a piston 16 which is slidably held within sleeve 10. The upper end of piston 16 is provided with an obturating cup 17 which prevents the grease from entering the piston portion of the chamber. This obturating cup rests on the piston and need not be fastened thereto. The cup thus prevents grease from entering the piston clearance and also prevents gas and grease leakage into the compartment where the ball is located. The function of the grease is to protect the piston 16 and sleeve 10 from the corrosive effect of the explosive gases.

I have discovered that certain of the objects of this invention enumerated above may be achieved, and, by the same token, the corresponding objections in the use of the customary tarage cylinders, overcome, by the employment of spherical shaped deformable elements. The deformable element designated 1 in Fig. 1 is of spherical shape. By reason of the fact that ball 1, of copper, lead, or other suitable material, makes point contacts initially, both with the piston 16 and the seat of screw plug 11, the actual compressing or deforming pressure at the said point contact is considerably greater for a given gas pressure or force transmitted to the piston than would be the case were a cylinder, prism or similar shaped element used with the force applied to flat faces. This follows as a consequence of the fact that pressure (e. g. pounds per square inch) is the ratio of force (in pounds) to area of contact (square inches). Consequently, the ball element will be deformed by a gas pressure which although transmitting the same force to the piston, would cause a compressive pressure in the cylindrical element—whose contact is an area rather than a point—too low, relative to the elastic limit of the material, to permanently deform the cylinder. Hence the ball element when used in standard types of gauges, is capable of measuring pressures lower than those which can be measured with standard tarage cylinders, and, in the pressure ranges in which tarage cylinders are usable, the ball element has been found to give more accurate pressure indications over wider ranges.

Figure 3:
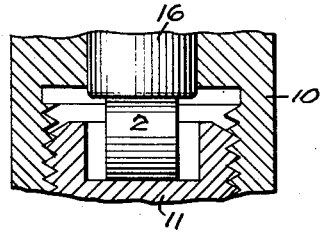
Fig. 3 is a fragmental sectional elevation showing the use of a cylinder laid on its side.

Instead of a sphere, a cylindrical element may be employed, not oriented in the customary manner, longitudinally of the container, but placed on its side to present a line contact with the piston and the plug 11, see cylinder 2, Fig. 3. A cylinder placed in this manner is not as satisfactory as a sphere, inasmuch as the pressure is along a line, rather than at a point.

The manner of using the improved gauge employing a spherical element or a cylindrical one placed perpendicular to the axis of the container is similar to the manner of use of tarage cylinders. The diameter of the ball is measured, with micrometer calipers or other instruments, before and after being subjected, in the container placed in the gun barrel, to permanent distortion by the generated gas pressure. The amount of permanent compression deformation of the sphere (or cylinder, on its side) is a direct measure of the maximum pressure developed in the gun or other chamber, and is found directly by referring to a calibration curve. The latter curve is first obtained by subjecting a selected ball of each batch of balls to a gradually increased known compression in a testing machine, such as a Tinius Olsen testing machine, measuring the permanent deformation of the ball after release of each load, and plotting these measures against the pressure of corresponding loads. The balls in each batch are reproducible to better than 1%. One of the marked advantages of my invention is that the balls can be made in large quantities (several thousand at a time) with a high degree of uniformity, thereby making it unnecessary to caliper more than 10 or 20 in each batch manufactured. Consequently the diameter thereof need not be measured before the ball is used.

Advantageously, the balls or cylinders should be cleaned and annealed. The cleaning is to remove grease, carbonaceous deposits and the like. The annealing, of course, results in deformable elements of uniform characteristics. Annealed copper balls are especially suitable.

It has been established by experiment that the improved deformable elements of this invention give linear Pressure-Deformation curves. The explanation thereof resides in the fact that the load contact areas of the spherical elements increase as the applied pressure increases.

Although I have more particularly described a gauge suitable for insertion in the wall of a pressure chamber and thus in communication therewith it will be apparent to those skilled in the art that other applications of my invention can be made for, as stated, it is only necessary that the piston be placed so as to respond to pressures developed, which in turn deform the deformable element. I do not wish to be limited to the precise structure of the gauge shown, or to the application of the invention to measuring gas pressures.

I claim:

1. A device of the class described, in combination, a tubular member provided with tapped threads at one end and with outside screw threads at its other end, a plug bolt screwed into the said tapped end, a closure member screwed onto the said outside threads of the tubular member and adapted to contain grease and provided with port holes, a piston slidably fitted in the said tubular member and provided with an obturating cup to prevent the grease from entering the said piston portion of the tubular member, and a deformable element positioned in the tubular member between the seat of the said plug screw and the said piston.

2. A device of the class described, in combination, a tubular member provided with tapped threads at one end and with outside screw threads at its other end, a plug bolt screwed into the said tapped end, a closure member screwed onto the said outside threads of the tubular member and adapted to contain grease and provided with port holes, a piston slidably fitted in the said tubular member, and a deformable element positioned in the tubular member between the seat of the said plug and the said piston.

3. A device as in claim 2 in which said deformable element is a sphere.

4. A device as in claim 2 in which said deformable element is a cylinder with its axis positioned transverse to that of the tubular member.

5. A device for measuring pressure, in combination, a sleeve member closed at one end and operatively connected with the source of pressure at its other end, a piston slidably fitted in the said sleeve member and a deformable element positioned in the sleeve member between its said closed end and the said piston, the said deformable element being in the form of a sphere.

6. A device for measuring pressure, in combination, a sleeve member closed at one end and operatively connected with the source of pressure at its other end, a piston slidably fitted in the said sleeve member and a deformable element positioned in the sleeve member between its said closed end and the said piston, the said deformable element being in the form of a cylinder disposed with its longitudinal axis normal to the longitudinal axis of the said sleeve member.

7. A pressure measuring device which comprises a cylindrical container one end of which is operatively connected to the source of pressure and a piston slidable in the said container, an element of spherical shape and initially making point contacts with the piston and with the container end, whereby the compression pressure applied to the said element is increased for a given force transmitted from the said source of pressure to the piston, by reason of the smaller area of contact.

8. A pressure measuring device which comprises a cylindrical container one end of which is operatively connected to the source of pressure and a piston slidable in the said container, a deformable element of cylindrical shape and placed with its axis normal to the axis of the said piston container to make a line contact with the piston and with the container end, whereby the compression pressure applied to the said element is increased for a given force transmitted from the said source of pressure to the piston.

9. A pressure measuring device which comprises a cylindrical container one end of which is operatively connected to the source of pressure and a piston slidable in the said container, a deformable element the said element being of spherical shape and making point contacts with the piston and with the container end, the said point contacts increasing in area with the force transmitted by the piston.

10. A pressure measuring device comprising a container closed at one end and adapted to be operatively connected to the source of pressure at its other end, a piston slidable in said container, a deformable element between the piston and said closed end and having an area of contact with said piston and closed end less than the area defined by the intersection of any other plane through the element and parallel to the area of contact.

11. In a pressure measuring device, a container one end of which is adapted to be connected operatively with the source of pressure, a piston slidable in said container, a seat member in said container and forming a closure for the other end of the container, a deformable element between said piston and seat member and having piston and seat contact ends so shaped that the load bearing area at the said contact ends increases progressively with the load.

12. A pressure measuring device comprising a container having operative connections with the source of pressure, a piston and seat member in said container, a solid deformable element between said piston and seat member having a substantially point contact with said piston and seat.

13. As an article of manufacture, a device for measuring pressure comprising a sleeve member closed at one end and adapted to be operatively connected with the source of pressure at its other end, a piston slidably fitted in the said sleeve member and a deformable element positioned in the sleeve member between its said closed end and the said piston, the said deformable element being in the form of a sphere.

14. As an article of manufacture, a device for measuring pressure comprising a sleeve member closed at one end and adapted to be operatively connected with the source of pressure at its other end, a piston slidably fitted in the said sleeve member and a deformable element positioned in the sleeve member between its said closed end and the said piston, the said deformable element being in the form of a cylinder disposed with its longitudinal axis normal to the longitudinal axis of the said sleeve member.

CLARENCE N. HICKMAN.